(No Model.)
W. M. BRINKERHOFF.
SPRING TOOTH FOR HARROWS.
No. 384,188. Patented June 5, 1888.
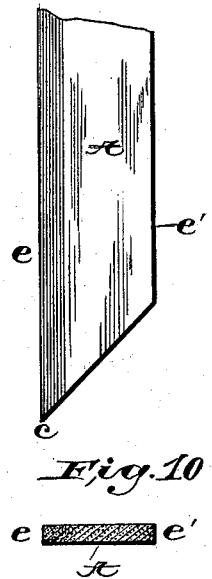
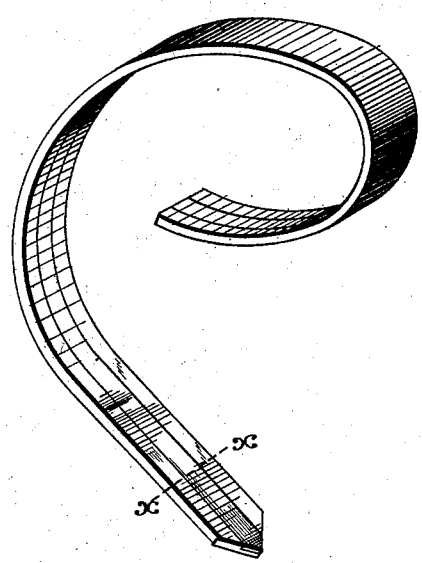
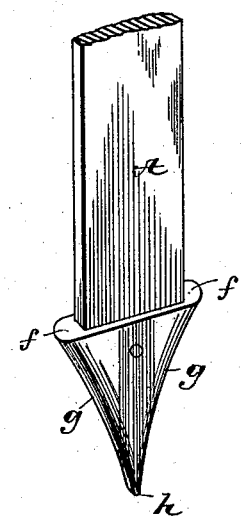
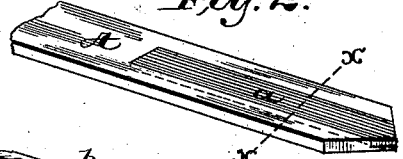
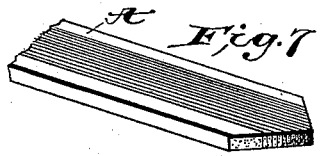
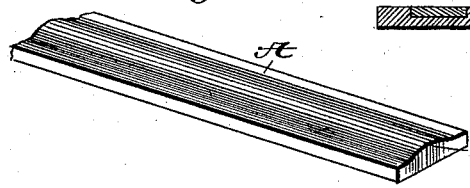
Witnesses:
E. F. Walker
L. B. Whitaker
Inventor.
Warren M. Brinkerhoff.
By his attys
Whitaker & Prevost

UNITED STATES PATENT OFFICE.

WARREN M. BRINKERHOFF, OF AUBURN, NEW YORK.

SPRING-TOOTH FOR HARROWS.

SPECIFICATION forming part of Letters Patent No. 384,183, dated June 5, 1888.

Application filed January 4, 1888. Serial No. 259,764. (No model.)

*To all whom it may concern:*

Be it known that I, WARREN M. BRINKERHOFF, a citizen of the United States, residing at Auburn, in the county of Cayuga and State of New York, have invented certain new and useful Improvements in Spring-Teeth for Harrows; and I do hereby declare the following to be a full, clear, and exact description of the invention, such as will enable others skilled in the art to which it appertains to make and use the same.

My invention relates to spring-teeth for harrows and other agricultural implements in which a spring-tooth is used for operating on the ground.

The ordinary spring-tooth in general use in this class of implements is objectionable in some particulars, and my invention has for its object the improvement of this class of articles, so as to avoid the objections to the constructions in general use. These springs are of considerable length and are bowed or arched, so as to give them the requisite length for easy vibration and to permit them to yield laterally as well as in line with the draft to pass obstacles. It has heretofore been proposed to provide rigid harrow-teeth with a harder center, in order that the wear by contact with the ground will keep them sharp; and it has been proposed to construct rigid earth-engaging blades of three coextensive thicknesses or layers of metal, the central layer or part being of harder material. Such constructions could not be applied to spring harrow-teeth. The middle layer or harder metal would prevent the wear from keeping the flat tooth pointed, and would seriously impair the elasticity of the tooth and destroy its capability of yielding laterally to pass obstacles, as the strain upon the tooth at such times is torsional. By my construction these objections are avoided and the tooth is given elasticity to torsional and draft-line strains, while the wear from contact with the earth serves to keep the point of the tooth sharp.

In order that my invention may be clearly understood, I have illustrated in the accompanying drawings several forms thereof, and the same will be more fully described in the following specification and claims.

In the drawings, Figure 1 is a perspective view of my improved spring-tooth. Fig. 2 is a portion of a tooth with a hardened section at the free end. Fig. 3 is a cross-section on the line *x x* of Figs. 1 and 2. Fig. 4 is a view of the earth-engaging end of a tooth, showing a raised or thickened center at the end before being rolled down. Fig. 5 is an isometric view, and Fig. 6 is a cross-section, of a bar before the final rolling. Fig. 7 is a portion of the tooth after being rolled down, showing the hardened portion in dark lines. Fig. 8 is a cross-section of the same. Fig. 9 is a portion of a tooth with the hardened section on one side. Fig. 10 is a cross-section of the same. Fig. 11 shows a modified form of my invention. Figs. 12 and 13 are cross-sections of other forms of bars before rolling. Fig. 14 is a cross-section of a bar with a hardened strip rolled in. Fig. 15 shows a form of bar which may be cold-rolled to form the tooth shown in Fig. 4.

The same letters of reference indicate identical parts in all the figures.

In the drawings, A represents a spring-tooth provided with a narrow flat strip of hardened metal rolled into the tooth flush with the front or inner side of the same and extending the entire length of the tooth, said strip being of less thickness than that of the tooth. I prefer to place this strip midway between the two edges of the tooth, so that as the tooth wears away the center, being harder than the sides, will wear more slowly, and thus keep the tooth pointed.

In Fig. 2 I have shown the tooth A as provided with a short strip of hardened metal at the free end only.

In Fig. 4 I have shown a portion of the pointed end of a tooth having a rib or thickened portion, *b*, at its center, this center being more compact and harder than the sides of the tooth. This rib preferably extends only a short distance from the point of the tooth.

In Figs. 9 and 10 I have shown the tooth A as provided with a hardened edge, *c*, and gradually decreasing in hardness or compactness toward the opposite edge. I then cut the tooth off diagonally, leaving the acute angle *d* on the hardened edge. In this case the wear will be greatest on the side $e$ and gradually decrease toward the side $e'$, thus keeping the tooth always pointed.

In Figs. 12 and 13 are shown cross-sections of other forms of bars before the final rolling. These bars are made harder by the final rolling by permitting them to cool down a greater or less extent, as found most desirable, and then passing them through the rolls for a final compression, the cold-rolling down of the rib producing a denser and harder portion at that point. The form shown in Fig. 4 is left with a thicker portion at the point of the tooth only; but this thicker portion is hardened in a similar manner.

In Fig. 11 the free end of the tooth A is fitted in a tip or cap, B, and secured thereto in any convenient manner. The large end $f$ of the tip B is somewhat wider and longer than the dimensions of the tooth, and its sides $g$ $g$ converge to a point, $h$. The central portion, $i$, of the cap is harder than its sides, so that the wear will be less at this point than at the sides. The large end F of the cap is provided with a recess, (shown in dotted lines,) into which the tooth A fits snugly. The tooth is then secured therein by rivets, or in any convenient manner.

In Fig. 14 the strip $a$ is made triangular in cross-section, and is rolled into the tooth in the same manner as heretofore described, thus making the central harder portion of the tooth thicker than at its edges.

In Fig. 15 I have shown a bar which may be cold-rolled to form the tooth shown in Fig. 4. The central part of this tooth being raised or thickened, the rib to be rolled down by the final compression is made higher and thicker than when the tooth is to be made of one uniform thickness. This same form of tooth may be made in the other ways described.

It will be observed that in the preferred constructions, which are those in which the point alone is constructed with the harder portion, the full elasticity and strength of the tooth is retained, and that the same can resist torsional and other strain as well as the ordinary tooth. It will also be seen that in the other forms the hardened portion is supported and strengthened by the softer portion of the tooth, so that the same possesses much of the tensile strength and elasticity of the ordinary tooth, and is therefore capable of producing good results.

It is to be noted that, the harder portion of the blade being narrow and forming only a part of the width of the spring-tooth, it does not offer any perceptible additional resistance to torsional strains, as it will in a measure serve as an axis for the mass of the tooth at the points where it is turned or twisted. The harder portion, also being located in the blade so as to form the point, is consequently at the place of greatest wear. In such cases, as it does not extend quite through the tooth, but forms a part of the front face of the same, the harder portion insures a sharp front cutting-edge.

I do not desire to be limited to a spring harrow-tooth or its exact construction, as other blades may be constructed on the same principle and the constructions shown varied to a considerable degree without departing from the spirit of my invention.

What I claim, and desire to secure by Letters Patent, is—

1. A flat spring harrow-tooth having a narrow portion of greater hardness than adjoining portions, the said harder portion being cohesively joined to the main body of the tooth and extending from the extreme earth-engaging point toward the opposite end of the tooth, the said hardened portion being located at the point of greatest wear and forming a part of the front surface of the tooth, substantially as described.

2. A flat spring-tooth having a narrow central portion of said tooth harder than adjoining side portions, said central portion extending from the earth-engaging point toward the opposite end of said tooth and forming the central part of the front surface of the tooth, substantially as described.

3. A flat spring harrow-tooth having its pointed end provided with a central portion harder than its side portions cohesively joined thereto, said central portion being of greater thickness than the edges, substantially as described.

4. A harrow-tooth having a portion of greater hardness than adjoining portions, said portion extending from the extreme earth-engaging point toward the opposite end of the tooth and gradually diminishing in hardness toward the edge of the tooth, substantially as described.

5. A harrow-tooth the central portion of which is harder than adjoining integral portions, said portions extending from the earth-engaging point toward the opposite end of the tooth and gradually diminishing in hardness toward the edges of the tooth, substantially as described.

6. A flat spring harrow-tooth of curved or arched form, having the front of the earth-engaging portion of the same composed of three transverse sections cohesively united in one integral body, the center portion being of greater hardness than the side portions, substantially as described.

7. As a new article of manufacture, a blade of greater width than thickness for engaging materials having a wearing action thereon, having a centrally-located harder portion, the said blade diminishing in hardness toward its edges, substantially as described.

8. As a new article of manufacture, a blade of greater width than thickness for engaging materials having a wearing action thereon, and having its wearing-edge provided with a centrally-located harder portion, the said harder portion gradually diminishing in hardness toward the edges of the blade, substantially as described.

9. A harrow-tooth having the upper part of its main body doubled back upon itself, (to increase vibration and elasticity,) the lower portion of its main body terminating in a forwardly-projecting pointed end, said pointed end having a central portion harder than side portions adjacent thereto, substantially as described.

In testimony whereof I affix my signature in presence of two witnesses.

WARREN M. BRINKERHOFF.

Witnesses:
H. A. HOBART,
A. J. BRINKERHOFF.